Nov. 12, 1935.    R. E. PAIGE    2,021,018
DISPLAY DEVICE
Filed Dec. 18, 1934    6 Sheets-Sheet 1
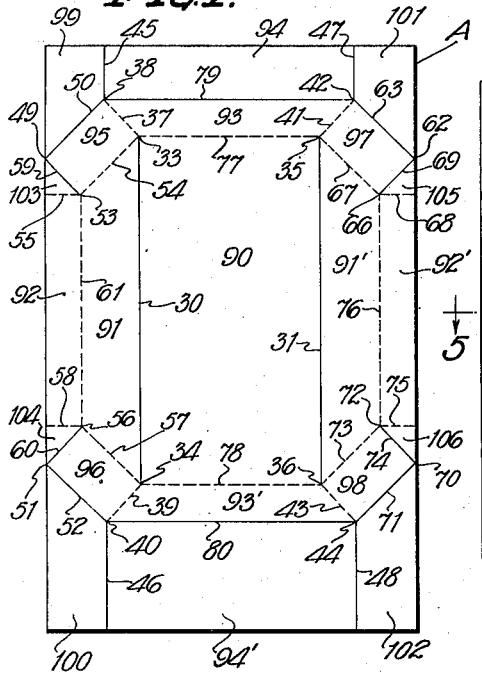
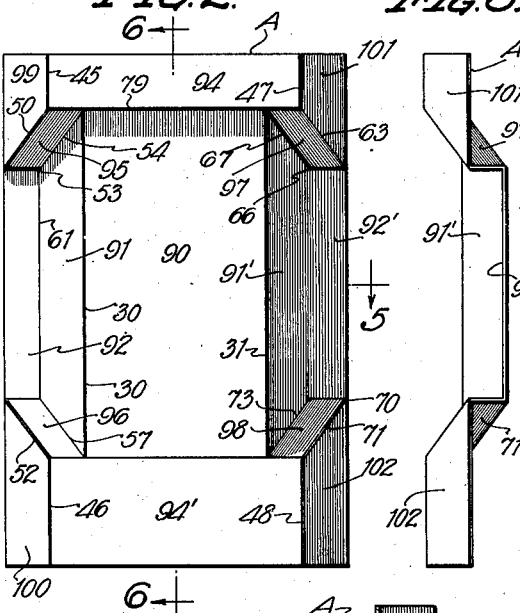
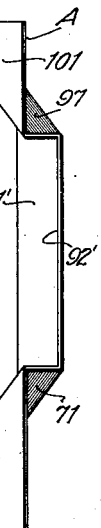
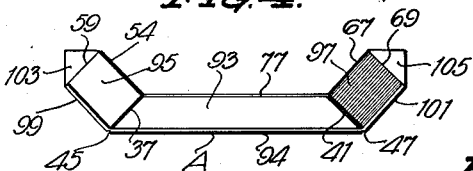
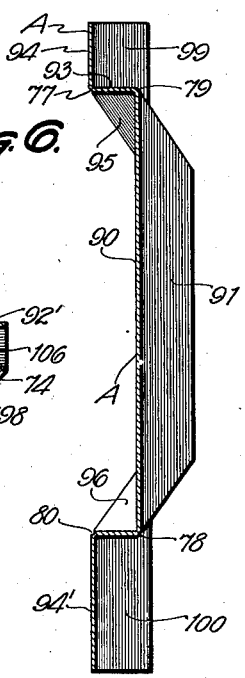
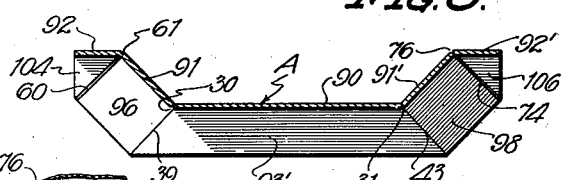
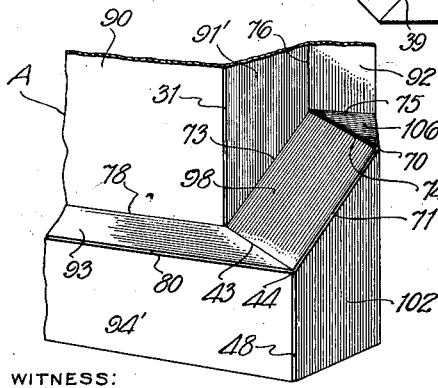
RICHARD E. PAIGE.
INVENTOR
BY Ely Pattison.
ATTORNEYS
WITNESS:

Nov. 12, 1935.  R. E. PAIGE  2,021,018
DISPLAY DEVICE
Filed Dec. 18, 1934  6 Sheets-Sheet 2
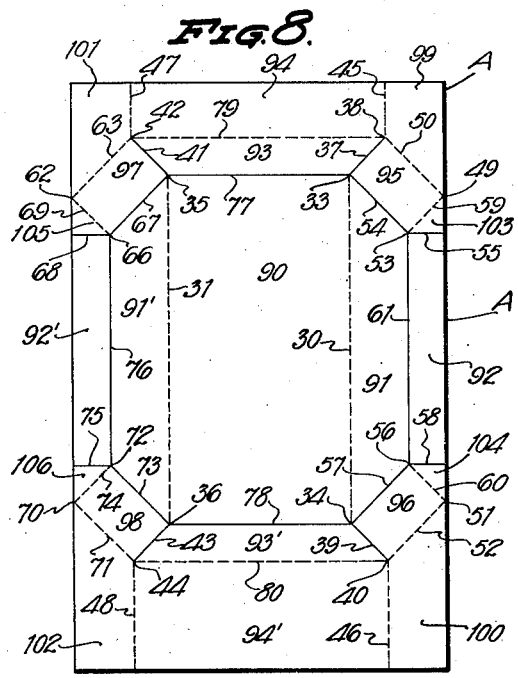
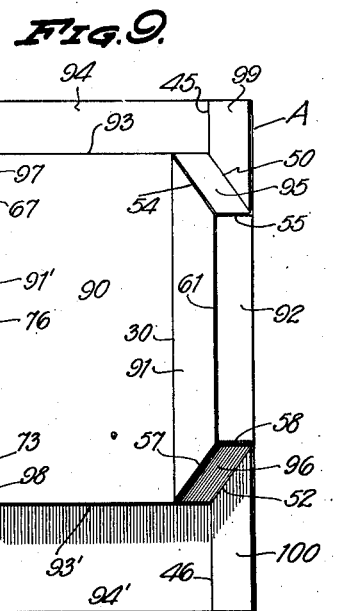
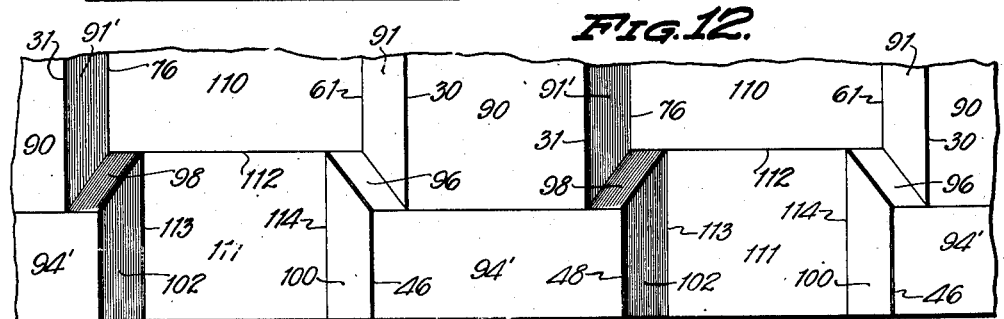
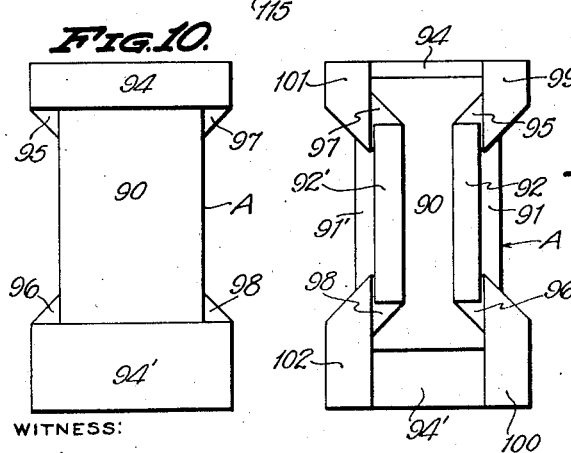
RICHARD E. PAIGE.
INVENTOR
ATTORNEYS Nov. 12, 1935.  R. E. PAIGE  2,021,018
DISPLAY DEVICE
Filed Dec. 18, 1934  6 Sheets-Sheet 3
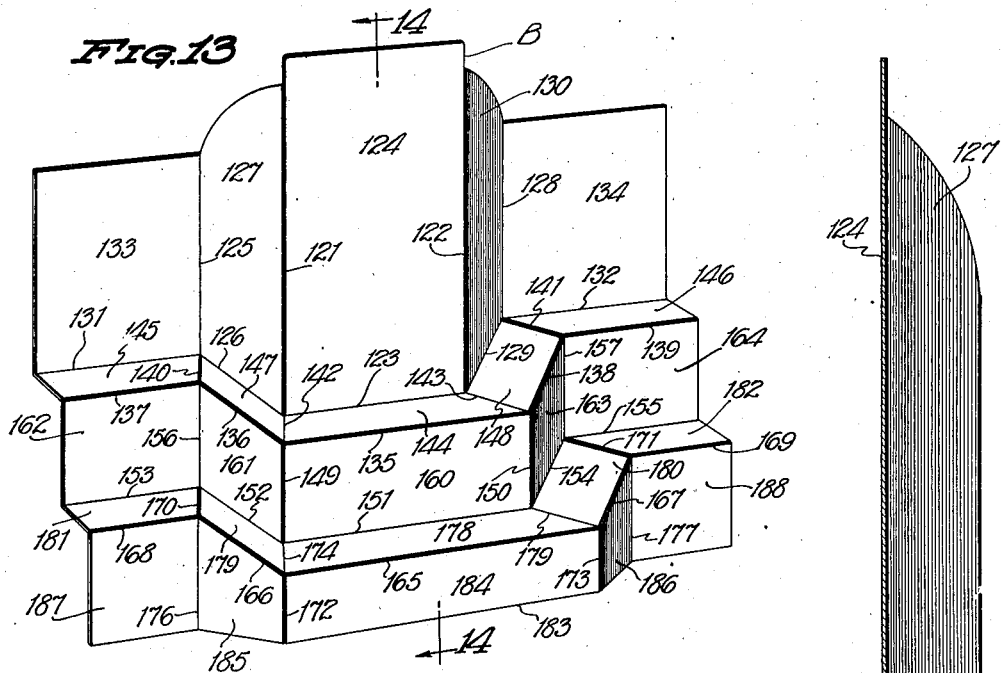
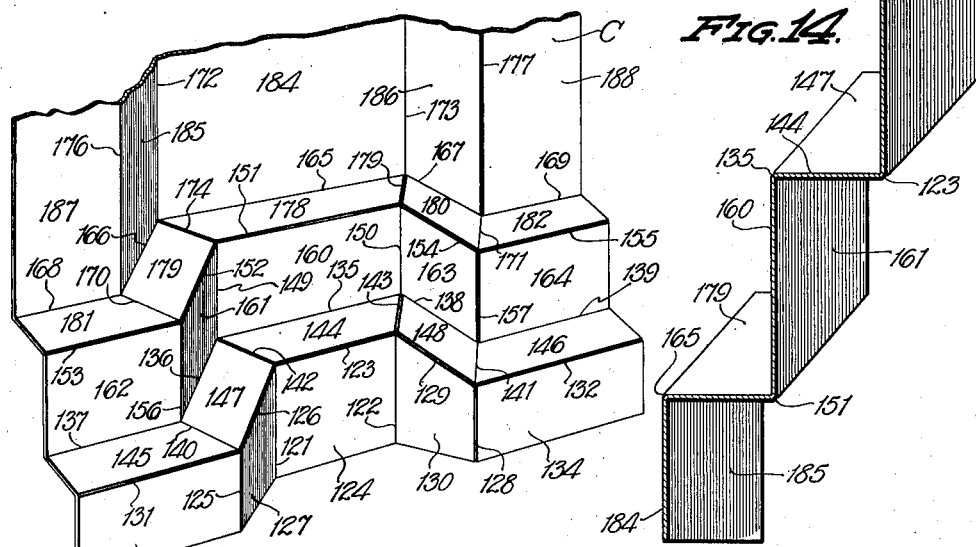
RICHARD E. PAIGE.
INVENTOR
WITNESS:
ATTORNEYS Nov. 12, 1935.  R. E. PAIGE  2,021,018
DISPLAY DEVICE
Filed Dec. 18, 1934  6 Sheets-Sheet 4
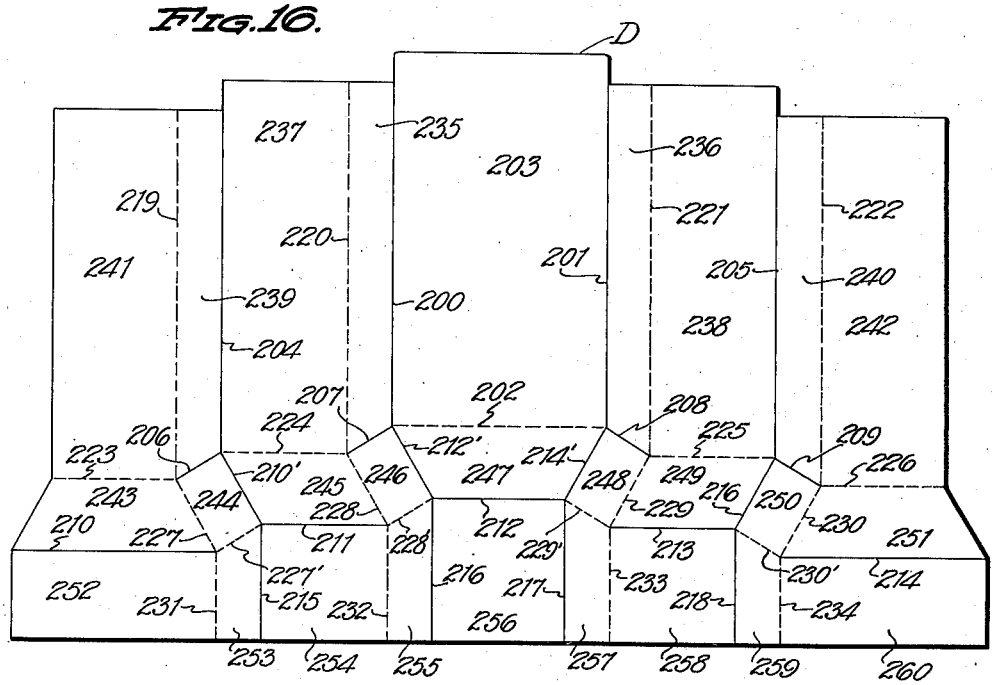
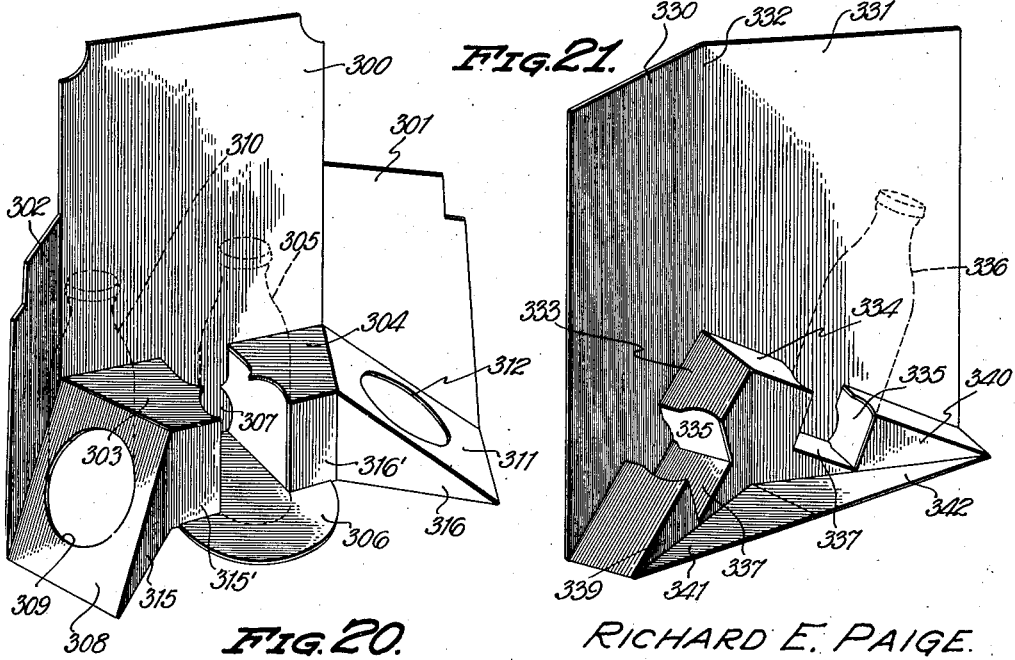
RICHARD E. PAIGE.
INVENTOR
BY
ATTORNEYS
WITNESS:

Nov. 12, 1935.  R. E. PAIGE  2,021,018
DISPLAY DEVICE
Filed Dec. 18, 1934   6 Sheets-Sheet 5
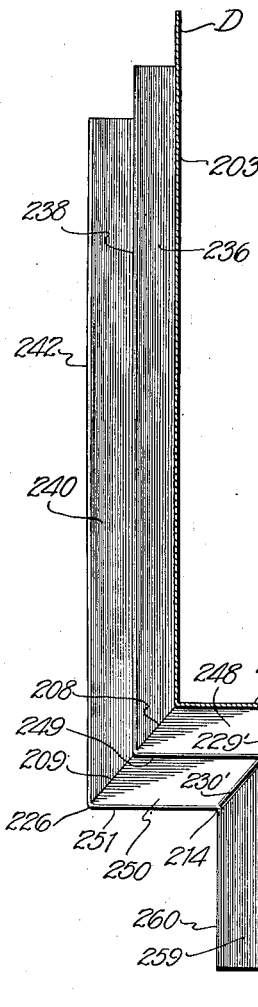
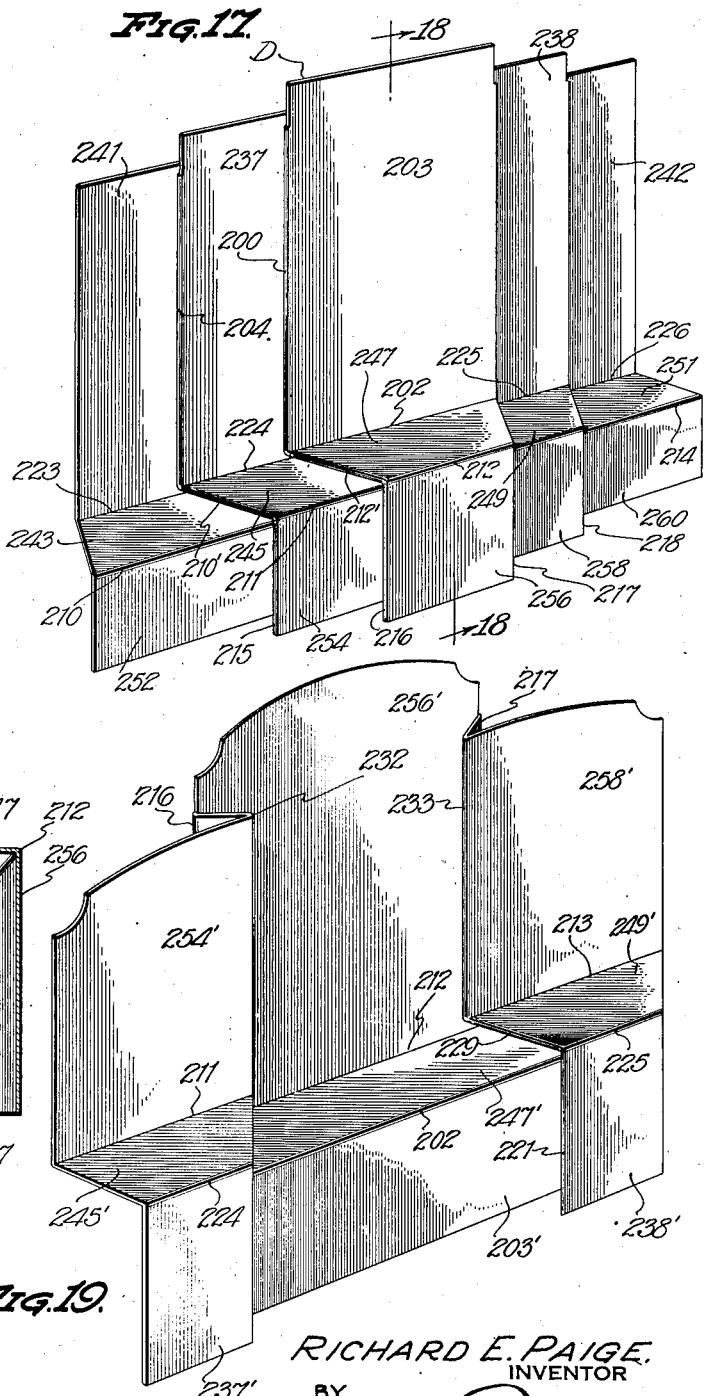
RICHARD E. PAIGE,
INVENTOR
BY
ATTORNEYS
WITNESS:

Nov. 12, 1935.  R. E. PAIGE  2,021,018
DISPLAY DEVICE
Filed Dec. 18, 1934   6 Sheets-Sheet 6
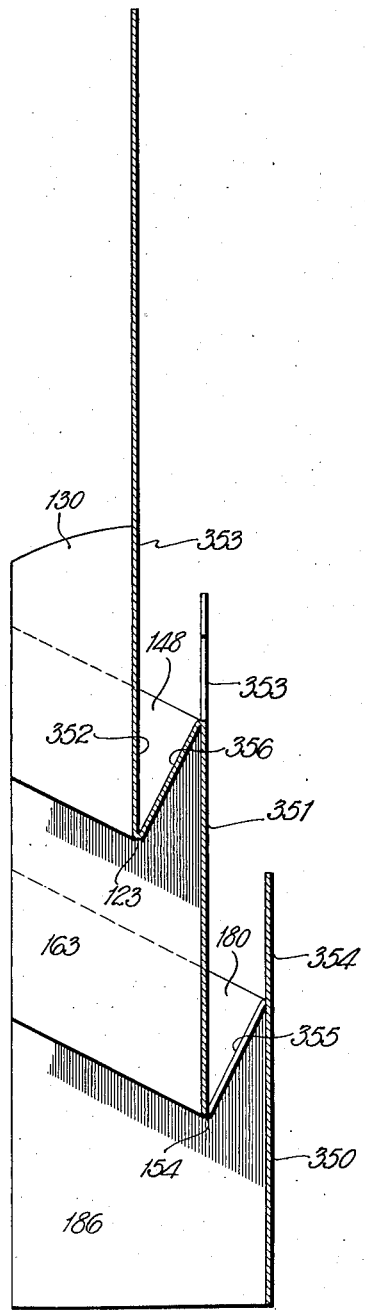
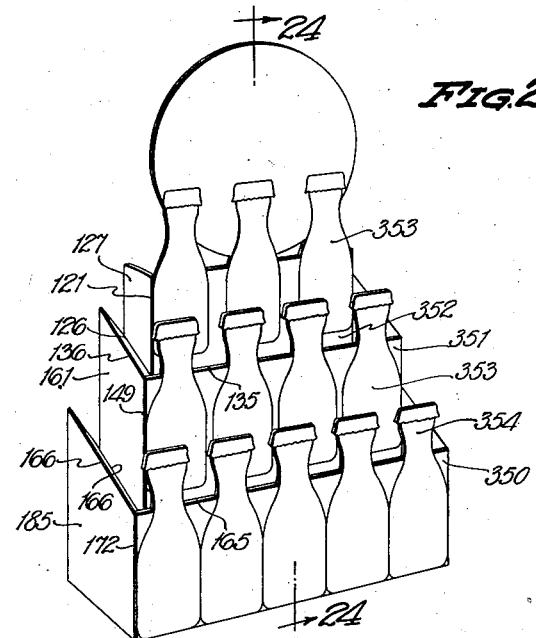
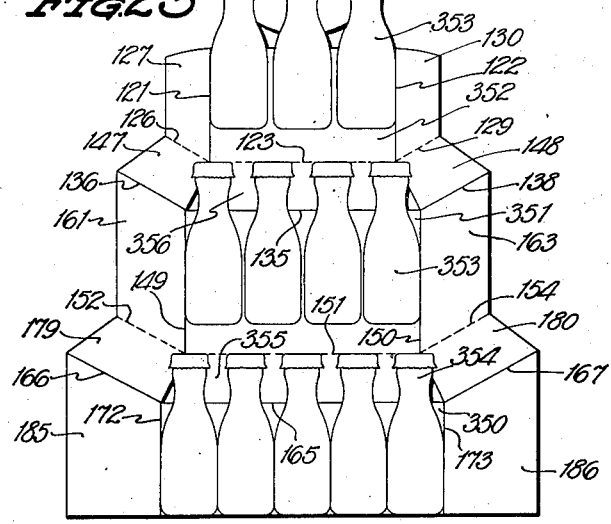
RICHARD E. PAIGE.
INVENTOR Patented Nov. 12, 1935

2,021,018

UNITED STATES PATENT OFFICE 2,021,018

DISPLAY DEVICE

Richard Eaton Paige, Flushing, N. Y.

Application December 18, 1934, Serial No. 757,983

9 Claims. (Cl. 211—73)

This invention relates to display devices and more particularly it pertains to display devices formed from cardboard, paper or other suitable material which may be scored, creased or otherwise formed with definite lines of fold in such manner that the finished article may be collapsed from set up position, or set up from collapsed position without rupture or damage thereto.

It is the primary object of the invention to improve the construction and operation of such devices and to produce a display device which is cheap and simple of manufacture and in which the setting up and collapsing is easily accomplished.

Folding and collapsing display devices have been heretofore constructed, but all such devices with which I am familiar are more or less intricate in construction and require special instructions and knowledge in order to manipulate or operate them without damage thereto.

A feature of the present invention resides in a novel construction and method of folding whereby a display device may be folded at the time of manufacture, thus rendering it readily and easily set up from its folded position merely by spreading it out whereupon the device will automatically assume the set up position.

A further feature of the invention resides in a novel method of scoring, creasing and folding whereby comparatively great strength may be imparted to relatively light material, thus materially reducing the initial cost of devices of this general character.

A further feature of the invention resides in a novel construction whereby an uneven contour is obtained which serves to enhance the beauty and appearance of the device by the production of angular lights and shadows resulting from said irregular contour.

A further object of the invention resides in a novel construction whereby panels and display forms in different planes may be obtained without formation of openings or otherwise mutilating the face of the device.

A further feature of the invention resides in a novel construction and arrangement whereby the device, although primarily an advertising and display device, may under certain conditions of use be employed to display the actual articles of merchandise of which the device constitutes an advertisement.

Still a further feature of the invention resides in a novel construction whereby, although the device may assume relatively large proportions when in its extended, or set up form, when in its collapsed or folded state, it is of relatively small dimensions thus making for easy handling and transportation thereof.

Still a further feature of the invention resides in a novel construction and arrangement whereby a maximum of copy display area is obtained.

Other objects and features of the invention will become apparent as the nature of the invention is better understood and reference will therefore be had to the accompanying drawings, in which:

Figure 1 is a plan view of a scored blank from which one form of the invention may be constructed, Figure 2 is a view illustrating the blank of Figure 1 in the extended or set up position, Figure 3 is a view in side elevation of that form of the invention illustrated in Figures 1 and 2, Figure 4 is a top plan view of that form of the invention illustrated in Figures 1 and 2, Figure 5 is a horizontal sectional view taken substantially on the line 5—5 of Figure 2, Figure 6 is a sectional view taken substantially on the line 6—6 of Figure 2, Figure 7 is a fragmentary detail perspective view, Figure 8 is a plan view illustrating the reverse side of the blank shown in Figure 1, Figure 9 is a view in elevation showing the reverse side of the device in its set up position as illustrated in Figure 2, Figure 10 is a view in elevation illustrating that form of the invention shown in Figures 1 to 11, in its collapsed or folded form, Figure 11 is a view similar to Figure 10, showing the reverse side of the device in its collapsed or folded form, Figure 12 is a fragmentary view in elevation on a slightly enlarged scale, illustrating a slightly different embodiment of that form of the invention illustrated in Figures 1 to 11, inclusive.

Figure 13 is a perspective view illustrating a slightly modified form of the invention, Figure 14 is a sectional view taken substantially on the line 14—14 of Figure 13, Figure 15 is a fragmentary perspective view of that form of the invention illustrated in Figures 13 and 14, the figure illustrating the device in an inverted position and exposing the reverse face to that shown in Figure 13, Figure 16 is a plan view of the blank from which the form of the invention illustrated in Figures 17 and 18 is formed, Figure 17 is a perspective illustrating another modified form of the invention, Figure 18 is a sectional view taken substantially on the line 18—18 of Figure 17, Figures 19, 20, 21 and 22 are perspective views illustrating various modifications or adaptations of the invention, Figure 23 is a plan view of a blank for forming that form of the invention illustrated in Figure 22, and;

Figure 24 is a sectional view on an enlarged scale taken substantially on the line 24—24 of Figure 22.

In Figures 1 to 11, inclusive, I have illustrated the invention in what may be termed one of its most simple forms, and in said figures, the device comprises a blank A of suitable material such as cardboard, paper or the like, which is scored, creased or otherwise formed or provided with definite lines of fold in such a manner that when the device is extended or set up, it produces an ornamental appearance and provides a support for merchandise to be offered for sale and when the device is folded or collapsed, it will take the form of a plurality of superimposed panels in face to face parallel relation, thus greatly reducing the over all dimensions of the device.

To accomplish the above described results, the blank A is provided on its front face with two lines of fold 30 and 31, preferably in the form of scores. These lines of fold 30 and 31 in the form illustrated do not extend throughout the entire length of the blank, but instead, terminate respectively at points 33, 34, and 35 and 36. Extending angularly from the point 33 in the direction of the adjacent side edge of the blank, there is a relatively short line of fold 37 which terminates at the point 38, and extending angularly from the point 34 to the adjacent side edge of the blank, there is a relatively short line of fold 39 which terminates at the point 40. Extending angularly from the point 35 in the direction of the adjacent side edge of the blank there is a relatively short line of fold 41 which terminates at the point 42, and extending angularly from the point 36 in the direction of the adjacent side edge of the blank there is a line of fold 43 which terminates at the point 44.

The lines of fold 37, 39, 41 and 43 are all preferably in the form of scores and are illustrated in dotted lines as being on the rear or reverse side or face of the blank when the blank is viewed as in Figures 1 to 7, inclusive.

Extending from the point 38 to the adjacent end of the blank there is a line of fold 45, and extending from the point 40 to the adjacent end of the blank, there is a line of fold 46. These lines of fold 45 and 46 are preferably in the form of scores on the front face of the blank and are so arranged that they are in longitudinal alinement with each other and would if continued, lie in spaced parallel relation with the line of fold 30. Extending from the point 42 to the adjacent end of the blank, there is a line of fold 47, and extending from the point 44 to the adjacent end of the blank, there is a line of fold 48. These lines of fold 47 and 48 are preferably in the form of score lines on the front face of the blank and are so arranged that they are in alinement with each other and would, if continued, lie in spaced parallel relation with the line of fold 31.

Extending angularly from the point 38 to a point 49 at the adjacent side edge of the blank, there is a line of fold 50 preferably in the form of a score line on the front face of the blank, and extending from the point 40 to a point 51 at the adjacent side edge of the blank, there is a line of fold 52 which is preferably in the form of a score line on the front face of the blank.

Extending from the point 33 to a point 53, and arranged upon the rear face of the blank, there is a line of fold 54 which is parallel to the line of fold 50, and extending from the point 53 to the adjacent side edge of the blank there is a similar line of fold 55. Extending from the point 34 to the point 56 and arranged upon the rear face of the blank, there is a line of fold 57, and extending from the point 56 to the adjacent side edge of the blank, there is a similar line of fold 58. Extending from the point 49 to the point 53, there is a line of fold 59, and extending from the point 51 to the point 56, there is a line of fold 60. These last two mentioned lines of fold, 59 and 60 are preferably score lines on the front face of the blank. Connecting the points 53 and 56 there is a line of fold 61 which is in the form of a score line on the rear face of the blank and which extends parallel with the line of fold 30, heretofore mentioned.

Extending from the point 42 to a point 62 on the adjacent side edge of the blank on the front face thereof, there is an angularly disposed line of fold 63, and extending from the point 35 to a point 66, but positioned upon the rear face of the blank, there is a line of fold 67, and extending from the point 66 to the adjacent side edge of the blank, there is a line of fold 68 which is also upon the rear face of the blank. Connecting the two points 62 and 66, and arranged upon the front face of the blank, there is a line of fold 69. Extending from the point 44 to the point 70 at the adjacent side edge of the blank, and arranged upon the front face thereof, there is a line of fold 71, and extending parallel therewith from the point 36 to the point 72, but arranged upon the rear face of the blank, there is a line of fold 73. Extending from the point 70 to the point 72, and positioned upon the front face of the blank there is a score line 74, and extending from the point 72 to the adjacent side edge of the blank upon the rear face thereof, there is a score line 75, and connecting the point 66 with the point 72 on the rear face of the blank, there is a score line 76. Connecting the point 33 with the point 35 there is a line of fold 77, and connecting the point 34 with the point 36, there is a line of fold 78. These lines of fold preferably consist of score lines and they are formed on the rear face of the blank. Connecting the point 38 with the point 42, there is a line of fold 79, and connecting the point 40 with the point 44, there is a line of fold 80. These lines of fold 79 and 80 are preferably in the form of score lines which are formed on the front face of the blank.

The several crease or score lines above mentioned divide the blank into a plurality of panels which will now be specifically described.

A relatively large centrally disposed panel 90 forms the main body portion of the device, and upon the sides of said panel 90 there are side panels 91 and 91'. The side panel 91 is bordered by the crease or score lines 30, 54, 57 and 61, the side panel 91' being bordered by the crease or score lines 31, 67, 73 and 76. These side panels 91 and 91' do not extend to their respective side edges of the blank but are instead separated therefrom by relatively long and narrow side panels 92 and 92', respectively. The side panel 92 is bordered by the lines of fold 55, 58 and 61 and the adjacent side edge of the blank, and the side panel 92' is bordered by the lines of fold 68, 72 and 76 and the adjacent side edge of the panel.

At the ends of the panel 90 there are relatively long narrow end panels 93 and 93'. The end panel 93 is bounded by the lines of fold 37, 41, 77 and 79 and the end panel 93' is bordered by the lines of fold 39, 43, 78 and 80. Between the end panel 93 and the adjacent end edge of the blank there is a panel 94 which is bordered by lines of fold 45, 47 and 79 and the adjacent end edge of the blank and adjacent the end panel 93', there is an end panel 94' which is bordered by the lines of fold 46, 48 and 80 and the adjacent end edge of the blank.

The lines of fold 37, 50, 54 and 59 define a panel 95 which is located between the adjacent ends of the panels 91 and 93. The lines of fold 39, 52, 57 and 60 define a panel 96 located between the adjacent ends of the panels 91 and 93'. The lines of fold 41, 63, 67 and 69 define a panel 97 which is located between the adjacent ends of the panels 91' and 93, and the lines of fold 43, 71, 73 and 78 define a panel 98 which is located between the adjacent ends of the panels 91' and 93'.

Located between the panel 95 and the adjacent corner of the blank there is a panel 99 which is defined by the lines of fold 45 and 50, and a portion of the side and end edges of the blank. Located between the panel 96 and the adjacent corner of the blank there is a panel 100 which is defined by the lines of fold 46 and 52 and a portion of the side and end edges of the blank. Located between the panel 97 and the adjacent corner of the blank there is a panel 101 which is defined by the lines of fold 47 and 63, and a portion of the adjacent side and end edges of the blank, and located between the panel 98 and the adjacent corner of the blank there is a panel 102 which is defined by the lines of fold 48 and 71 and a portion of the adjacent side and end edges of the blank.

Between the adjacent ends of the panels 92 and 95 there is a panel 103 and between the adjacent ends of the panels 92 and 96 there is a panel 104. Between the adjacent ends of the panels 92' and 97, there is a panel 105 and between the adjacent ends of the panels 92' and 98, there is a panel 106.

Except for the panels 103, 104, 105 and 106, the panels are of substantially rectangular form. The panels 103, 104, 105 and 106 are of triangular form.

In Figure 1 the blank is shown in its flat form before it has been broken along the several lines of fold to provide a display device as heretofore mentioned, and I will now describe the manner in which the blank is manipulated to produce a display device such as illustrated in Figure 2.

In its set up position, in each of its forms, the panel 90 constitutes the main body portion of the display device. By reason of the angular position of the lines of fold 54, 57, 67, and 73 which are formed by creasing or scoring the blank upon the rear face thereof and the fact that the score or crease lines 30 and 31 are formed upon the front face of the blank, the panels 91 and 91' recede from the side edges of the panel 90 when the device is in its set up position. The panels 92 and 92', by reason of the fact that the score or crease lines which form the lines of fold 61 and 76 are upon the rear face of the blank, occupy a position to the rear of the panel 90 but in a plane parallel thereto. The panels 93 and 93' project forwardly from the panel 90 in a plane at substantially right angles to the plane of the panel 90, while the panels 94 and 94' are projected forwardly of the panel 90 but occupy a position in a plane parallel therewith. The panels 95, 96, 97 and 98 all assume positions at an angle to each of the panels adjacent thereto and the relatively smaller triangular panels 103, 104, 105 and 106 occupy positions in horizontal planes. The panels 99 and 101 recede from the ends of the panel 94 and the panels 100 and 102 recede from the ends of the panel 94'.

In its set up form, as illustrated in Figures 1 to 6, inclusive, the panels 93', 104 and 106 occupy positions in a horizontal plane and are connected together by the panels 96 and 98 which occupy an angular position, as shown. The horizontal panels 93', 104 and 106 provide supporting shelves or the like upon which merchandise may be displayed, while the panels 90, 92, 92', 94 and 94', provide ample space for the display of advertising copy.

So far, the device has been described as it is used in the manner shown in Figures 1 to 6, inclusive, of the drawings. In this same form, however, the device is capable of use in a reverse position as illustrated in Figures 8 and 9 of the drawings. In this reverse position, the panels 91 and 91', instead of receding from the panel 90, extend forwardly thereof and the panels 93 and 93' instead of projecting forwardly of the panel 90 recede therefrom. When the device is employed in this reverse position, the panels 93, 103 and 105 form shelf-like supports for merchandise to be displayed for sale, while the panels 90, 92, 92', 94 and 94', provide ample space for the display of advertising copy the same as in the previously described use of the device except that the rear faces of these panels are employed instead of the front faces thereof.

While the device may be shipped or transported in the flat blank form in which it is shown in Figure 1, it is preferable to fold or collapse it, as shown in Figures 10 and 11, for this purpose, since not only does the device occupy less space when in its collapsed or folded position, but is much easier to set up from this position than from the unbroken flat blank position. It will be noted by inspection of Figures 10 and 11, which are front and rear views respectively of the device in its collapsed or folded form, that when in this position, the several panels occupy positions overlying one another in compact form and further that the device is materially reduced in both its longitudinal and transverse dimensions, which latter is due to the fact that the panels 91, 91', 92, 92', 95, 96, 97, 98, 99, 100, 101 and 102 all fold to a position behind the panel 90, while the panels 93, 93', 94 and 94', all fold to a position overlying the front of the panel 90.

By reference to the drawings, it will be noted that each panel has its own inherent direction of fold and that the direction of each of the angularly disposed panels 95, 96, 97, 98, 103, 104, 105 and 106 is in a line across, or at an angle to the direction of fold of all other panels and yet, by the specific arrangement of the several lines of fold, the device is free to be flexed or folded with each panel following its inherent direction of fold without in any manner damaging the device.

In Figure 12 there is shown a slightly modified form of the invention in which a larger piece of material may be so provided with lines of fold that when the device is set up it provides two such devices as illustrated in Figures 1 to 7, inclusive, connected together. In this form of the invention, the panel 92 of one device merges with the panel 92' of the other device to provide a centrally disposed panel 110 which is connected by the panels 91 and 91'. In this form of the invention the panels 100 and 102 are connected by a panel 111, which is defined by lines of fold 112, 113, 114, and the end edge 115 of the blank.

In Figures 13 and 14 there is illustrated still another modified form of the invention which is in many respects similar to that form illustrated in Figures 1 to 11, inclusive.

The form illustrated in Figures 13 and 14 is constructed from a single blank of material B. The blank is scored on its front face as at 121 and 122, and upon its rear face as at 123 to provide a main panel 124. The blank is also scored upon its rear face as at 125 and 126 to provide a side panel 127 and at 128 and 129 to provide a side panel 130. The blank is also scored upon its rear face as at 131 and 132. The score line 131, together with the score line 125, defines a panel 133 and the score line 132, together with the score line 128, defines a panel 134.

The blank is further scored upon its front face as at 135, 136, 137, 138, 139, 140, and 141, and upon its rear face on the lines 142 and 143. The score lines 123, 135, 142, and 143 define a panel 144 which extends forwardly from the base of the panel 124 in a plane substantially at right angles to the plane thereof. The score lines 131, 137 and 140, together with the side edge of the blank, define a panel 145 which extends forwardly from the panel 133 in a plane substantially at right angles to that of said panel and in a plane elevated with respect to the plane of the panel 144 but parallel to the plane thereof. The score lines 132, 139, 141 and the side edge of the blank define a panel 146 which, similar to the panel 145, extends forwardly from the base and its respective panel 134 in a plane substantially at right angles to the plane thereof and in a plane elevated with respect to the plane of the panel 144 but parallel therewith. The score lines 126, 136, 140 and 142 define a panel 147 which is positioned in an angular plane and connects the adjacent ends of the panels 144 and 145. The score lines 129, 138, 141 and 143 define a panel 148 which is disposed in an angular plane and connects the adjacent ends of the panels 144 and 146.

The blank is further scored upon its outer face as at 149 and 150, and upon its rear face as at 151, 152, 153, 154, 155, 156 and 157. The score lines 135, 149, 150, and 151 define a panel 160 which depends from the outer edge of the panel 144 and although spaced from the panel 124, the panel 160 occupies a plane which is parallel to the plane of the panel 124. The score lines 136, 149, 152 and 156 define a panel 161 which depends from the front edge of the panel 147 and occupies a position in a plane parallel with the plane of the panel 127. The score lines 137, 153, and 156, together with the side edge of the blank, define a panel 162 which depends from the front edge of the panel 145 and occupies a position in a plane parallel with the plane of the panel 133. The score lines 138, 150, 154, and 157 define a panel 163 which depends from the front edge of the panel 129 and occupies a position in a plane parallel to the plane of the panel 130. The score lines 139, 155, 157, together with the edge of the blank, define a panel 164 which depends from the front edge of the panel 146 and occupies a plane parallel with the plane of the panel 134.

The blank is further scored upon its outer face upon the lines 165, 166, 167, 168, 169, 170, 171, 172 and 173 and upon its rear face upon the lines 174, 175, 176, and 177.

The score lines 151, 165, 174, and 175, define a panel 178 which projects forwardly from the lower edge of the panel 160 in a plane substantially at right angles thereto, which plane is parallel with the plane of the panel 144. The score lines 161, 166, 170, and 174 define a panel 179 which projects forwardly from the lower edge of the panel 152 and occupies a position in a plane parallel with the plane of the panel 147. The score lines 154, 167, 171, and 175 define a panel 180 which projects forwardly from the lower edge of the panel 163 and occupies a position in a plane parallel with that of the panel 129. The score lines 153, 168, and 170, together with the side edge of the blank, define a panel 181 which extends forwardly from the lower edge of the panel 162 and occupies a position in a plane substantially parallel with the plane of the panel 145. The score lines 155, 169, and 171, together with the side edge of the blank, define a panel 182 which extends forwardly from the lower edge of the panel 164 and occupies a position in a plane substantially parallel with the plane of the panel 146.

The score lines 165, 172, and 173, together with the edge 183 of the blank, define a panel 184 which depends from the front edge of the panel 178 and occupies a position in a plane substantially parallel with the planes of the panels 124 and 160. The score lines 166, 172 and 176, together with the edge 183 of the blank define a panel 185 which depends from the front edge of the panel 179 and occupies a position in a plane substantially parallel with the planes of the panels 127 and 161. The score lines 167, 173, and 177, together with the edge 183 of the blank, define a panel 186 which depends from the forward edge of the panel 180 and occupies a position in a plane substantially parallel with the planes of the panels 130 and 163. The score lines 168 and 176, together with the side edge of the blank and the edge 183 thereof, define a panel 187 which depends from the front edge of the panel 181 and occupies a position in a plane substantially parallel with the planes of the panels 133 and 162. The score lines 169 and 177, together with the side edge of the blank, and the edge 183 thereof, define a panel 188 which depends from the forward edge of the panel 182 and occupies a position in a plane substantially parallel with the planes of the panels 134 and 164.

In Figure 13 the several score lines which are formed upon the front face of the blank are indicated in double lines while those formed upon the rear face of the blank are indicated in single lines. Also, in the foregoing description of the form illustrated in Figures 13 and 14, the device has been described which the panels are described as occupying, being the positions of the panels in the set up position of the device.

When the device is set up as illustrated, the panels 144, 145, 146, 178, 181, and 182, provide suitable shelf-like supports upon which articles of merchandise may be displayed, the remaining panels and particularly the panels 124, 133 and 134 providing ample space for advertising copy. In this form of the invention as in the form previously described, the blank is scored after which it is broken to set the device up and when it is desired to transport the article or a plurality thereof the device is collapsed.

In collapsing the device, it is folded upon the several score lines in such a manner that the panels 127, 130, 133, 134, 145, 146, 147, 148, 161, 162, 163, 164, 179, 180, 182, 185, 186, 187, and 188 fold to position partially behind the panels 124, 160 and 184. The panel 160 folds flat upon the panel 124 with the panel 144 interposed between them, and the panel 184 folds flat upon the panel 160 with the panel 178 interposed between them. To accomplish this collapsing or folding of the blank it is merely necessary to apply pressure to the upper edge of the panel 124 and the edge 183 of the blank or lower edge of the panel 184, force these edges towards each other, and to again extend the blank to the set up position it is only necessary to move the upper edge of the panel 124 and the edge 183 of the blank or lower edge of the panel 184 in opposite directions away from each other.

In Figure 15 there is shown another manner in which the invention as illustrated in Figures 13 and 14 may be employed. In Figure 15 the blank, which is designated C, is scored in identically the same manner as described in connection with Figures 13 and 14. In said Figure 15, however, the blank is reversed end for end, and that face which is the front face in Figures 13 and 14 becomes the rear face in Figure 15, and that edge 183 of the blank which forms the bottom edge of the device in Figures 13 and 14, becomes the top edge in Figure 15, which has been broken away to indicate that it may be extended as desired and provided with any particular type of ornamental defining edge.

In this last mentioned position the top edges of the panels 124, 127, 128, 133, and 134 are flush or in line with one another and become the bottom or supporting edge of the device shown in Figure 15, and the panels 184, 185, 186, 187, and 188, are extended to the desired height to carry display advertising copy. It will also be noted that in this form of the invention, since the device has been reversed, that instead of the panels 127 and 128 receding from the panel 124, and the panels 161 and 163 receding from the panel 160 and the panels 185 and 186 receding from the panel 184, the panels 184, 160, 124 occupy positions in planes to the rear respectively of the panels 187 and 188, 162 and 164, and 133 and 134, and therefore, the panels, 127, 130, 161, 163, 185, and 186 project forwardly of their respective panels.

The breaking of the blank, folding the device to extended position, and folding the device to collapsed position are accomplished in this form of the invention in the same manner as described for that form illustrated in Figures 13 and 14.

In Figures 16, 17 and 18 there is shown a still further modified form of the invention.

The device as shown in these figures is formed from a blank D shown in plan view in Figure 16 and said blank is scored or creased upon its front face as at 200 and 201, and on its rear face as at 202 to provide a centrally disposed panel 203. The blank D is also scored or creased upon its front face upon the lines 204, 205, 206, 207, 208, 209, 210, 210', 211, 212, 212', 213, 214, 214', 215, 216, 218', 217, and 218, and upon its rear face in addition to the line of fold 202, the blank is creased or scored in the lines 219, 220, 221, 222, 223, 224, 225, 226, 227, 227', 228, 228', 229, 229', 230, 230', 231, 232, 233, and 234.

The score lines 200, 207, 220, and a portion of the top edge of the blank define a panel designated 235, the score lines 201, 208, and 221 and a portion of the top edge of the blank define a panel designated 236. The score lines 204, 220, and 224, and a portion of the top edge of the blank define a panel 237 and the score lines 205, 221, 225 and a portion of the top edge of the blank define a panel designated 238. The score lines 204, 206, and 219, and a portion of the top edge of the blank define a panel designated 239, and the score lines 205, 209, and 222, together with a portion of the top edge of the blank define a panel designated 240. The score lines 219 and 223, together with a portion of the top edge of the blank and a portion of the adjacent side edge of the blank define a panel designated 241, and the score lines 222 and 226, together with a portion of the top edge of the blank and a portion of the adjacent side edge of the blank define a panel designated 242. The score lines 210, 223, 227, and a portion of the adjacent side edge of the blank define a panel 243. The score lines 206, 210', 227 and 227' define a panel 244. The score lines 210', 211, 224, and 228 define a panel 245. The score lines 207, 212', 228 and 228' define a panel 246. The score lines 202, 212, 212' and 214' define a panel 247. The score lines 208, 214', 229 and 229' define a panel 248. The score lines 213, 216', 225 and 229, define a panel 249. The score lines 209, 30, 216', 230 and 230' define a panel designated 250, and the score lines 214, 226 and 230, together with the adjacent side edge of the blank define a panel 251. The score lines 210 and 231 together with a portion of the side edge and a portion of the bottom edge of the blank define a panel 252. The score lines 215, 227', and 231, together with a portion of the bottom edge of the blank, define a panel 253. The score lines 211, 215, and 232 together with a portion of the bottom edge of the blank, define a panel 254. The score lines 216, 228', and 232, together with a portion of the bottom edge of the blank define a panel 255. The score lines 212, 216, and 217, together with a portion of the bottom edge of the blank, define a panel 256. The score lines 217, 229', and 233, together with a portion of the bottom edge of the blank define a panel 257. The score lines 213, 218, and 233, together with a portion of the bottom edge of the blank define a panel 258. The score lines 218, 230', and 234, together with a portion of the bottom edge of the blank, define a panel 259, and the score lines 214 and 223, together with a portion of the side edge of the blank and a portion of the bottom edge of the blank, define a panel 260.

The blank is creased or scored to provide the several lines of fold as above described and when this has been done the blank is broken upon the several lines of fold to provide the several panels designated. In its set up position, in which position it is shown in Figure 18, the panels 203, 237, 238, 241, 242, 252, 254, 256, 258, and 260 provide areas for the display of advertising copy, while the panels 243, 245, 247, 249, and 251, which in the set up position of the device occupy a horizontal plane, provide shelf-like surfaces upon which articles of merchandise may be placed for display purposes. With the device illustrated in this form of the invention in its set up position, to collapse the same the panels 237, and 238 are folded partially behind the panel 203 with the panels 241 and 242 folding partially behind the panels 237 and 238, respectively. The panels 245 and 249 fold partially behind the panels 247 with the panels 243 and 251 folding partially behind the panels 245 and 249, respectively. The panels 254 and 258 fold partially behind the panel 256 while the panels 252 and 260 fold partially behind the panels 254 and 258, respectively. In moving to the folded position, the device also folds upon the score lines 202, 223, 224, 225, and 226, and upon the score lines 210, 211, 212, 213, and 214 in such a manner that the bottom edge of the device will fold towards the upper edge thereof with the several panels 243, 244, 245, 246, 247, 248, 249, 250, and 251 overlying those panels which are directly above them, while the panels 252, 253, 254, 255, 256, 257, 258, 259, and 260 fold upwardly upon the score lines 210, 227', 211, 228', 212, 229', 213, 230', and 214 to a position where they overlie the panels next above them in the blank.

When the device is folded as above described from its set up position to its folded or collapsed position, it is reduced in both its transverse and longitudinal dimensions so that it occupies comparatively little space.

The form of the invention illustrated in Figure 19 is similar to the form illustrated in Figures 17 and 18 except that the panels 241, 242, 243, 251, 252 and 260 are removed and the entire device is inverted so that that portion which constitutes the rear face in the form shown in Figure 17 becomes the front face in the form shown in Figure 19. To construct the form shown in Figure 19 the blank is scored or creased and folded in identically the same manner as it is in the form illustrated in Figures 17 and 18. However, in this last mentioned form of the invention the panel 256', and which corresponds to the panel 256 of the form shown in Figures 17 and 18, is both broader and longer than the panel 256. The panels 254' and 258' in the form shown in Figure 19 are both longer and broader than their corresponding panels 254 and 258 in the form shown in Figures 17 and 18, and the panels 245' and 249', while no wider, are longer than their corresponding panels 245 and 249 in the form shown in Figures 17 and 18. The panels 237', 203', and 238' in the form shown in Figure 19 have been reduced in length over their corresponding panels 237, 203, and 238 in Figures 17 and 18.

In Figure 20 there is illustrated a still further modified form of the invention in which there is an upstanding panel 300 from the side edges of which panels 301 and 302 extend forwardly. Near the bottom edge of the panel 300 there are two panels 303 and 304 which are cut out to receive an article such as 305 which rests on an extension 306, the extension projecting forwardly from the bottom edge of a central portion 307 of the panel 300. Extending angularly downwardly and forwardly from the outer end of the panel 303 there is a panel 308 which is provided with an opening 309 for the reception of an article 310 to be displayed, and extending angularly and downwardly from the outer end of the panel 304 there is a panel 311 provided with an opening 312 for the reception of an article to be displayed in a manner similar to that heretofore described. The panel 308 is connected by a score line to the panel 302 and the panel 304, the panel 311 being connected to the panel 301 and the panel 304 by score lines. Extending downwardly from the panel 308 there is a panel 315 which has an extension panel 315', and extending downwardly from the panel 311 there is a panel 316 which has an extension panel 316' and these panels are connected to their respective panels by means of crease or score lines. In this form of the invention the device is formed from a single blank of material which is suitably scored to provide the panels described.

When this last mentioned form of the device is folded to its collapsed position the panels 301 and 302 are moved inwardly in such a manner as to overlie the panel 300 and the several panels 304, 308, 311, 315, 316 and the supporting extension 306 will fold inwardly and upwardly into overlying relation in a position between the inwardly folded panels 301 and 302 and the main panel 300.

In Figure 21 of the drawings there is shown a still further modified form of the invention and in this form there are two panels 330 and 331 which are folded along a score line 332 so that they stand at an angle to each other. Extending in opposite directions from the score line 332, there are two panels 333 and 334 each of which is provided with a cut out portion 335 for the reception of an article 336 to be displayed. The articles rest on suitable supports 337 which are extensions of the panels 330 and 331. Extending downwardly from the front edge of the panel 333 there is a panel 339, and extending downwardly from the panel 334 there is a panel 340. Extending forwardly from the panel 339 there is a panel 341, and extending forwardly from the panel 340 there is a panel 342. These two panels 341 and 342 aid in supporting the device and may also provide a suitable support for an article to be displayed.

In this last mentioned form of the invention the device is made from a single blank of material which is suitably creased or scored to form the lines of fold which define the several panels described.

In Figures 22 to 24 there is shown a still further modified form of the invention in which the device is so constructed as to provide a display of a plurality of articles arranged in groups, which groups are in stepped back relation to each other.

As illustrated in Figure 23 this device is formed from a single blank of material and is similar to the form of the invention illustrated in Figures 13, 14, and 15, except that in the form shown in Figures 22, 23 and 24 there is a third step added at the bottom of the device. The panels 350 and 351 which correspond respectively to the panels 184 and 160 in Figure 13, and the panel 352 are printed or otherwise ornamented to illustrate certain articles, such as bottles 353 and extensions of these articles such as that portion 354 are cut from the panels 355 and 356, which correspond respectively to the panels 144 and 178 in Figure 13. The upper group of articles are formed directly in the blank, there being no shelf behind them when the device is set up for display purposes as is the case in the lower groups of articles.

The device illustrated in Figures 22, 23 and 24 is collapsed in the same manner as heretofore described in connection with the form illustrated in Figures 13, 14 and 15, and it will be obvious that the extensions 354 of the printed portion of the blank will lie flat upon the main body portion thereof when folded.

From the foregoing it is obvious that the device in all its forms comprises a plurality of panels formed from a single blank of material and so formed that when the device is folded from its display to its collapsed position, both its transverse and longitudinal dimensions are materially decreased and that in this form it consists of a plurality of overlying panels occupying such positions that the entire device is of a relatively thin and flat nature.

Having thus described the invention, what is claimed as new, is:

1. A display device comprising a single uncut blank of material, a plurality of angularly related score or crease lines dividing said blank into a plurality of panels all of which are interrelated each having an inherent definite direction of fold, said score or crease lines bearing such relation to each other and to the panels that although the panels are connected, they may be simultaneously moved through their inherent definite direction of fold to a collapsed position in which the panels partly overlie one another.

2. A display device comprising a single uncut blank of material, a plurality of angularly related score or crease lines dividing said blank into a plurality of panels all of which are interrelated, said panels having inherent definite diverging directions of fold, said score or crease lines bearing such relation to each other and to the panels that although the panels are connected, they may be simultaneously moved through their inherent diverging directions of fold to a collapsed position in which the panels partly overlie one another.

3. A display device comprising a single blank of material, a set of score lines extending across said blank in parallel spaced relation, and a second set of score lines connecting the said parallel score lines and angularly disposed with relation thereto to provide a collapsible device having a plurality of panels in different but parallel planes and a plurality of panels occupying planes angularly disposed with relation to each other and to said first mentioned panels, said angularly disposed panels forming the connecting means between said first mentioned panels.

4. A display device comprising a collapsible blank of cardboard or similar material, score lines extending throughout a portion of said blank only and in parallel relation to each other, additional score lines forming continuations of said first mentioned score lines but arranged out of line therewith, an angularly arranged score line connecting each of said first mentioned score lines with its corresponding continuation score line, and score lines connecting the ends of the angular score lines whereby the blank when folded on the several score lines reduces its area in two directions simultaneously.

5. A display device comprising a collapsible blank of cardboard or similar material, a score line extending across said blank, and score lines extending angularly from said first mentioned score line in parallel relation to each other, whereby when the blank is flexed upon said score lines, it looses from its original dimensions simultaneously in two directions.

6. A display device comprising a single blank of material, a set of score lines extending laterally of said blank in parallel spaced relation, and a second set of score lines connecting the said parallel score lines and angularly disposed with relation thereto to provide a collapsible device having a plurality of panels in different but parallel planes connected together by panels in planes angularly related to said first mentioned panels and to each other.

7. A display device comprising a single piece of material scored to provide a plurality of parallel panels and a plurality of angularly disposed panels connecting said parallel panels, said angularly disposed panels moving in opposed directions to interposed relation with said parallel panels when the device is moved to its completely folded form.

8. A display device comprising a single piece of material, score or crease lines dividing said single piece of material into a plurality of panels which are scored or creased upon at least two sides, said panels folding in opposite directions when moving the device to collapsed or folded position.

9. A display device comprising a single blank of material, said blank having a plane unbroken surface, and score or crease lines dividing said blank into a plurality of panels certain of which, when the blank is set up in display position, provide supporting shelves in stepped planes connected by angularly disposed panels all of which have uninterrupted smooth faces.

RICHARD EATON PAIGE.